(12) United States Patent
Colby et al.

(10) Patent No.: US 8,714,219 B2
(45) Date of Patent: May 6, 2014

(54) INTEGRATED TIRE SECTION REPAIR

(75) Inventors: E. Bruce Colby, Greenville, SC (US);
Ralph E. Wimmer, Simpsonville, SC (US)

(73) Assignee: Michelin Recherche et Technique S.A. (CH)

( * ) Notice: Subject to any disclaimer, the term of this patent is extended or adjusted under 35 U.S.C. 154(b) by 248 days.

(21) Appl. No.: 13/001,410

(22) PCT Filed: Jun. 27, 2008

(86) PCT No.: PCT/US2008/068498
§ 371 (c)(1),
(2), (4) Date: Dec. 24, 2010

(87) PCT Pub. No.: WO2009/157941
PCT Pub. Date: Dec. 30, 2009

(65) Prior Publication Data
US 2011/0094644 A1    Apr. 28, 2011

(51) Int. Cl.
*B29C 73/04* (2006.01)
*B29C 73/10* (2006.01)

(52) U.S. Cl.
USPC ............... 152/370; 152/367; 156/97; 156/98

(58) Field of Classification Search
USPC ................ 156/95, 97, 98; 152/367, 370, 371
See application file for complete search history.

(56) References Cited

U.S. PATENT DOCUMENTS

| | | |
|---|---|---|
| 1,591,817 A | 7/1926 | Hawkinson |
| 2,547,487 A | 4/1951 | Penney |
| 2,585,635 A | 2/1952 | Dibble |
| 2,596,179 A | 5/1952 | Seymour |
| 2,638,955 A | 5/1953 | Gruber |
| 2,833,327 A | 5/1958 | Boyce |
| 3,004,580 A | 10/1961 | Chambers et al. |
| 3,080,907 A | 3/1963 | Barrett |
| 3,095,342 A | 6/1963 | Kraly |
| 3,133,586 A | 5/1964 | Wolfe |

(Continued)

FOREIGN PATENT DOCUMENTS

| | | |
|---|---|---|
| CA | 1335560 | 5/1995 |
| CA | 2354284 | 1/2003 |

(Continued)

OTHER PUBLICATIONS

SU 41858 A1—English abstract translation obtained from McElroy Translation on Aug. 10, 2012, 1 page.

(Continued)

*Primary Examiner* — Geoffrey L Knable
(74) *Attorney, Agent, or Firm* — Hahn Loeser & Parks LLP; Bret A. Hrivnak (57) ABSTRACT

Methods of repairing tire portions have steps that include removing at least part of the damaged portion of the tire to form an aperture or opening through the tire; forming one or more grooves in the tire adjacent to and extending from the aperture; placing at least one repair reinforcement within each of the one or more grooves; placing a patch on the tire to cover the aperture and each repair reinforcement; and, applying material to fill the remainder of the opening.

16 Claims, 12 Drawing Sheets

(56) References Cited

U.S. PATENT DOCUMENTS

| | | |
|---|---|---|
| 3,133,587 A | 5/1964 | Wolfe |
| 3,143,156 A | 8/1964 | Fagert et al. |
| 3,160,194 A | 12/1964 | Barrett |
| 3,267,981 A | 8/1966 | Bennies |
| 3,282,319 A | 11/1966 | Barnett |
| 3,299,936 A | 1/1967 | Van Den Berg |
| 3,306,332 A | 2/1967 | Williams et al. |
| 3,332,466 A | 7/1967 | Wolfe |
| 3,448,784 A | 6/1969 | Sons, Jr. |
| 3,648,750 A | 3/1972 | Felden |
| 3,719,218 A | 3/1973 | Leybourne, III |
| 3,730,247 A | 5/1973 | White |
| 4,285,382 A | 8/1981 | DiRocco et al. |
| 4,317,692 A | 3/1982 | Niconchuk |
| 4,333,508 A | 6/1982 | DiRocco et al. |
| 4,375,231 A | 3/1983 | Bubik et al. |
| 4,385,651 A | 5/1983 | Arquilla |
| 4,399,854 A | 8/1983 | DiRocco et al. |
| 4,408,649 A | 10/1983 | Litterini |
| 4,424,088 A | 1/1984 | Durif |
| 4,434,832 A | 3/1984 | Koch et al. |
| 4,540,035 A | 9/1985 | Roberts |
| 4,696,332 A | 9/1987 | Koch |
| 4,718,469 A | 1/1988 | Koch et al. |
| 4,836,930 A | 6/1989 | Hill |
| 4,923,543 A | 5/1990 | Koch et al. |
| 5,139,840 A | 8/1992 | Ferrara |
| 5,247,981 A | 9/1993 | Benedicto, Jr. et al. |
| 5,335,707 A | 8/1994 | Sano et al. |
| 5,695,577 A | 12/1997 | Ferrara |
| 5,713,842 A | 2/1998 | Kay |
| 5,830,295 A | 11/1998 | Hobbs et al. |
| 6,026,878 A | 2/2000 | Zhang et al. |
| 6,386,255 B1 | 5/2002 | Majumdar et al. |
| 6,426,129 B1 | 7/2002 | Kalwara et al. |
| 6,438,932 B1 | 8/2002 | De Vos et al. |
| 7,027,877 B2 | 4/2006 | Dupelle et al. |
| 2006/0037507 A1 | 2/2006 | Trigg et al. |
| 2008/0142137 A1 | 6/2008 | Scheungraber |
| 2009/0229737 A1 | 9/2009 | Fujiwara et al. |

FOREIGN PATENT DOCUMENTS

| | | |
|---|---|---|
| DE | 1141552 B | 12/1962 |
| DE | 1225981 B | 9/1966 |
| DE | 1244003 B | 7/1967 |
| DE | 1912469 A1 | 9/1970 |
| DE | 3515944 A1 | 11/1986 |
| DE | 3926946 A1 | 1/1991 |
| DE | 29610697 B | 9/1996 |
| EP | 0025180 A2 | 3/1981 |
| EP | 0279901 | 8/1988 |
| EP | 0353313 A1 | 2/1990 |
| FR | 634317 A | 2/1928 |
| FR | 1203408 A | 1/1960 |
| FR | 1226595 A | 7/1960 |
| FR | 1287560 A | 3/1962 |
| GB | 839087 A | 6/1960 |
| GB | 1082327 A | 9/1967 |
| GB | 1280210 A | 7/1972 |
| JP | 63041209 A | 2/1988 |
| JP | H07-137155 A | 5/1995 |
| JP | H07-172123 A | 11/1995 |
| JP | 8244124 A | 9/1996 |
| JP | 11-010746 | 1/1999 |
| JP | 2000-512230 A | 9/2000 |
| JP | 2002-103923 | 4/2002 |
| NL | 9302004 A | 6/1995 |
| RU | 2176954 C1 | 12/2001 |
| SA | 41858 A1 | 2/1935 |
| SU | 238143 A1 | 2/1969 |
| SU | 1648807 A1 | 5/1991 |
| SU | 1708666 A1 | 1/1992 |
| WO | 85/04619 A1 | 10/1985 |
| WO | 2005/051259 A2 | 6/2005 |
| WO | 2006/094775 A1 | 9/2006 |

OTHER PUBLICATIONS

SU 238143 A1—English abstract translation obtained from McElroy Translation on Aug. 10, 2012, 1 page.

SU 1648807 A1—English machine translation obtained using Google Translate (http://translate.google.com) on Apr. 9, 2012, 3 pages.

SU 1708666 A1—English abstract translation obtained from McElroy Translation on Aug. 10, 2012, 1 page.

RU 2176954 C1—English abstract obtained from Espacenet (http://worldwide.espacenet.com) on Apr. 9, 2012, 1 page.

PCT/US2008/068498 International Search Report dated Oct. 2, 2008.

PCT/US2008/068498 International Written Opinion dated Oct. 2, 2008.

PCT/US2008/068567 International Search Report dated Oct. 2, 2008.

PCT/US2008/068567 International Written Opinion dated Oct. 2, 2008.

PCT/US2008/068597 International Search Report dated Nov. 28, 2008.

PCT/US2008/068597 International Written Opinion dated Nov. 28, 2008.

PCT/US2008/068870 International Search Report dated Nov. 28.

PCT/US2008/068870 International Written Opinion dated Nov. 28.

DE3926946A1—English machine translation obtained from European Patent Office website (http://translationportal.epo.org) on Aug. 3, 2012, 2 pages.

FR634317A—English machine translation obtained from Espacenet (http://worldwide.espacenet.com) on Dec. 5, 2012, 4 pages.

FR1203408A—English machine translation obtained from Espacenet (http://worldwide.espacenet.com) on Dec. 5, 2012, 4 pages.

FR1226595A—English machine translation obtained from Espacenet (http://worldwide.espacenet.com) on Jan. 28, 2013, 4 pages.

FR1287560A—English machine translation obtained from Espacenet (http://worldwide.espacenet.com) on Jan. 28, 2013, 4 pages.

DE1141552B—English machine translation obtained from Google Translate (http://translate.google.com) on Jan. 11, 2013, 4 pages.

DE1244003B—English machine translation obtained from Espacenet (http://worldwide.espacenet.com) on Oct. 15, 2012, 4 pages.

DE1912469A1—English machine translation obtained from Espacenet (http://worldwide.espacenet.com) on Jan. 28, 2013, 6 pages.

EP0025180A2—English abstract and machine translation obtained from Espacenet (http://worldwide.espacenet.com) on Jan. 28, 2013, 8 pages.

DE3515944A1—English abstract obtained from Espacenet (http://worldwide.espacenet.com) on Jan. 25, 2013, 1 page.

JP63041209A—English abstract and machine translation obtained from Espacenet (http://worldwide.espacenet.com) Jan. 8, 2013, 23 pages.

EP0353313A1—English abstract and machine translation obtained from Espacenet (http://worldwide.espacenet.com) on Jan. 23, 2013, 8 pages.

JP-H07-137155-A—English abstract and machine translation obtained from Patent Abstract of Japan (http://www19.ipdl.inpit.go.jp) on Oct. 11, 2012, 5 pages.

(56) References Cited

OTHER PUBLICATIONS

NL9302004A—English abstract obtained from Espacenet (http://worldwide.espacenet.com) on Oct. 15, 2012, 1 page.
JP-H07-172123—Aabstract and machine translation obtained from Patent Abstract of Japan (http://www19.ipdl.inpit.go.jp) Oct. 11, 2012, 7 pages.
JP8244124A—English abstract obtained from Espacenet (http://worldwide.espacenet.com) on Jan. 8, 2013, 2 pages.
JP2000-512230A—English machine translation obtained from Patent Abstracts of Japan (http://www4.ipdl.inpit.go.jp) on Jan. 8, 2013, 4 pages.
WO2006/094775A1—English abstract and machine translation obtained from Espacenet (http://worldwide.espacenet.com) on Jan. 28, 2013, 5 pages.

INTEGRATED TIRE SECTION REPAIR

This application is a National Stage application of International Application No. PCT/US2008/068498, filed Jun. 27, 2008, to which this application claims priority and the benefit of, the disclosure of which is also hereby incorporated by reference.

BACKGROUND OF THE INVENTION

1. Field of the Invention

The invention relates to a method and apparatus for repairing damaged portions of tires.

2. Description of the Related Art

It is generally known that a tire may become damaged. Damage may result from encountering road hazards and debris, or may be the result of tire mounting or dismounting, or an accident. In some instances, the damage may include abrasions, lacerations, or punctures.

One prior art method of repairing injuries to the body plies of a tire involves removing the damaged material, overlaying the section along an inside surface of the tire with a patch containing wires or cords, and filling the damaged area with rubber. With this technique, the repair reinforcements are offset relative to the tire's original reinforcements by a distance extending between the tire reinforcement and the reinforcement location within the patch. Therefore, the patch reinforcements are located beyond the interior surface of the tire, which may result in a distance at least 5-6 mm or more from the patch reinforcements to the tire reinforcements. When greater distances between the patch reinforcements and the tire reinforcements exist, shear amplitudes operating between the patch reinforcements and the tire reinforcements increase, which may lead to patch separation and failure. This limits the size and durability of the repairs.

Another repair technique involves removing a large trapezoidal section of the tire sidewall to a predetermined size and shape of a replacement patch section, where the patch reinforcements are substantially aligned within the same plane as the tire reinforcements. This technique is difficult and time consuming to practice, as it requires precise preparation of the trapezoidal tire aperture to match the patch dimensions, which is primarily done from the inside of the tire. It is also inflexible, as the tire is prepared to the predetermined patch size and shape.

SUMMARY OF THE INVENTION

Particular embodiments of the present invention include methods for repairing portions of tires. Such repair of tire portions is performed after injury to the tire that results from, for example, interaction with a road hazard. Particular embodiments of methods of the present invention, that are methods of repairing tire portions have steps that include removing at least part of the damaged portion of the tire to form an opening through the tire; forming one or more grooves in the tire adjacent to and extending from the opening; placing at least one repair reinforcement within each of the one or more grooves; placing a patch on the tire to cover the opening and each repair reinforcement; and, applying material to fill the remainder of the opening.

Other embodiments for repairing damaged tire portions have steps that include identifying a tire having a plurality of reinforcements extending through the tire, the tire having a damaged portion in at least one of the sidewall, tread, or shoulder; removing at least part of the damaged portion of the tire to form a cavity; forming one or more grooves in the tire adjacent to and extending from the cavity; placing at least one repair reinforcement within each of the one or more grooves; and placing a patch on the tire to cover and the cavity and each repair reinforcement.

Other embodiments for repairing damaged tire portions have steps that include removing at least part of the damaged portion of the tire to form an aperture or opening through the tire or cavity in the tire; forming one or more grooves in an inner surface of the tire adjacent to and extending from the opening or cavity; applying an adhesive to the one or more grooves; placing at least one repair ply within each of the one or more grooves, the repair play comprising rubber having one or more reinforcements embedded therein; placing a patch on the inner surface of the tire to cover the opening and each repair ply; and, applying material to fill the remainder of the opening or cavity.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF THE DRAWINGS

Particular embodiments of the present invention provide methods for repairing damaged tire portions.

Figure 1:
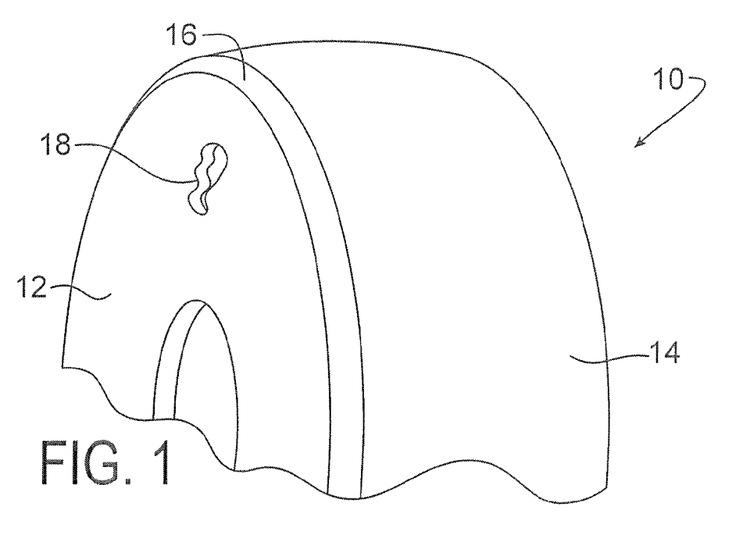
FIG. 1 is a perspective view of a tire with a damaged section in need of repair.
Figure 2A:
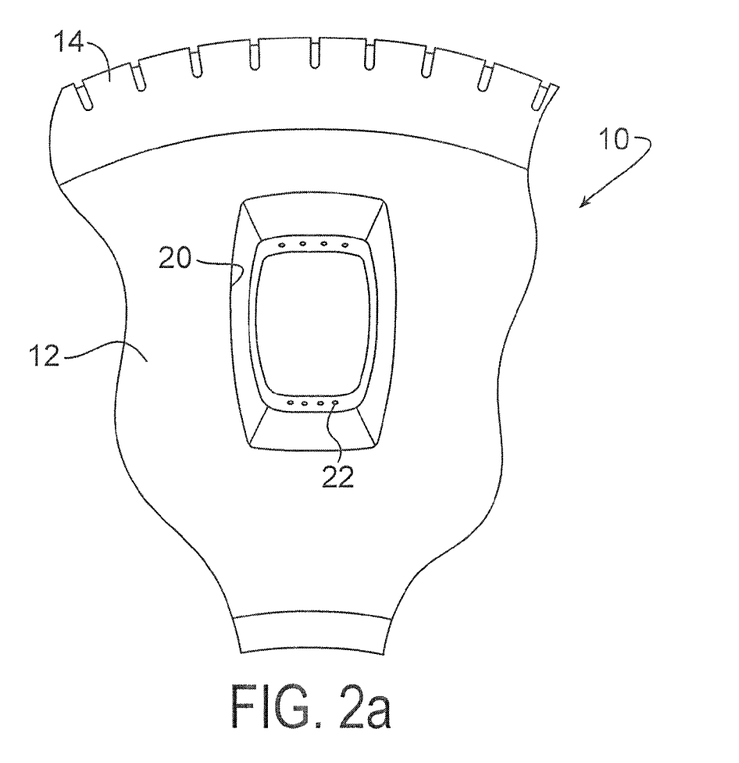
FIG. 2a is a side view of an outer portion of the tire shown in FIG. 1, shown with damaged portion removed.
Figure 2B:
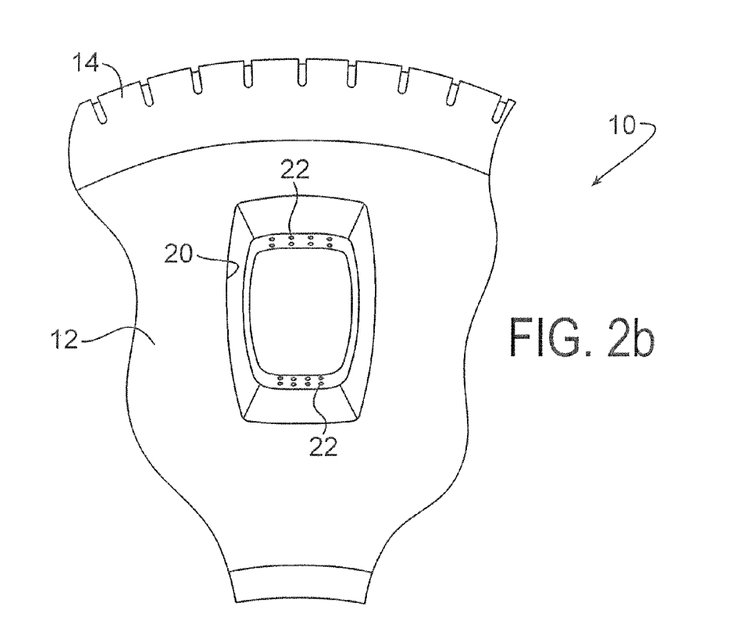
FIG. 2b is a side view of an outer portion of a tire having multiple layers of reinforcements, also shown with damaged portion removed.

Particular embodiments of the present invention include one or more steps for repairing a tire 10 having a damaged sidewall 12, tread 14, or shoulder 16. The steps may include identifying a tire 10 having a plurality of reinforcements 22 extending through the tire 10, the tire 10 having a damaged portion 18 in at least one of the sidewall 12, tread 14, or shoulder 16. The tire reinforcements 22 may comprise one or more layers of metallic cables, including steel cables; textile cords, including nylon cords, aramid cords, or any other textile cords known in the art; or any other reinforcement known in the art, and any combination thereof. If the tire 10 comprises two or more layers of reinforcements 22, the layers may be arranged in either a biased or radial orientation. Furthermore, the layers can be aligned in a stacked relationship, as illustrated in FIG. 2b, or could be arranged in an alternating or offset pattern.

The steps may further include the step of removing or excising at least part of the damaged section or portion 18 of the tire 10. Generally, the amount of damaged material removed is not more, or not significantly more, than an amount required to repair the damage. In one particular embodiment, the step may include removing or excising at least part of the damaged section or portion 18 of the tire 10 to form an aperture or opening 20 through the tire 10. In another embodiment, the step may include removing or excising at least part of the damaged section or portion 18 of the tire 10 to form a cavity 21 in the tire 10 rather than an opening 20.

Figure 4A:
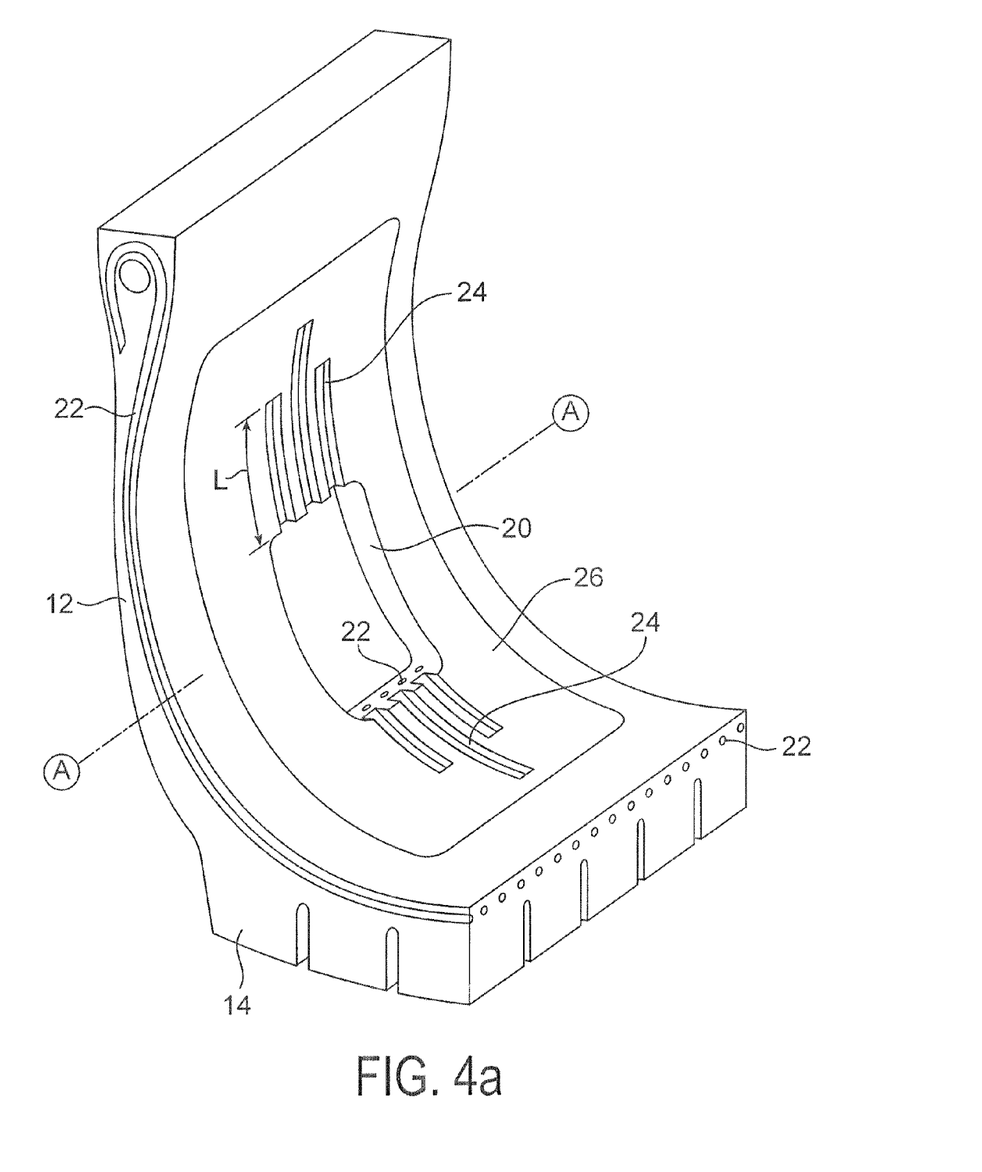
FIG. 4a is an inverted perspective view of FIG. 3.
Figure 4B:
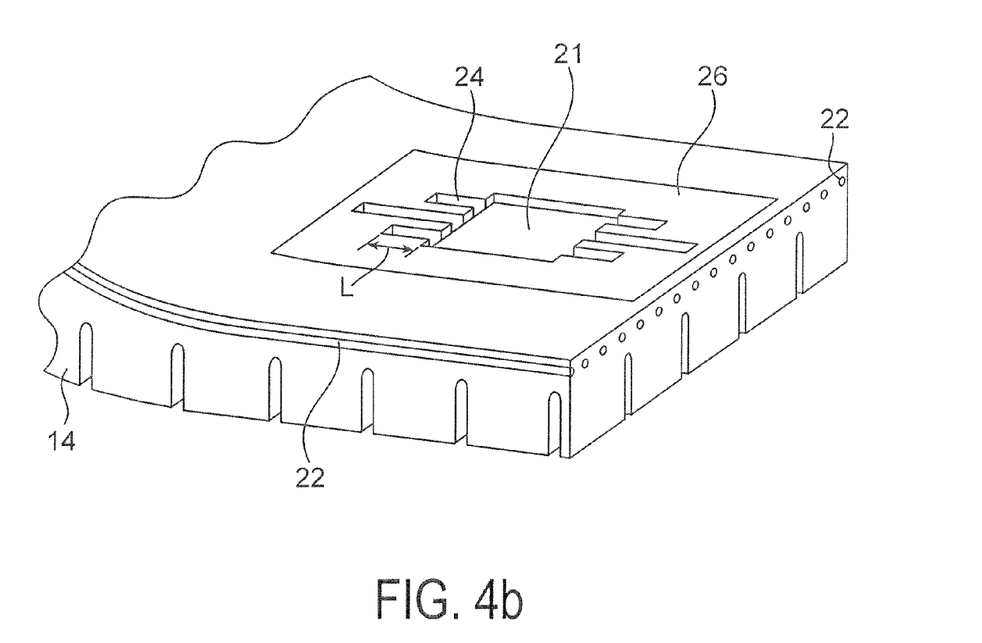
FIG. 4b is a perspective view of an inner portion of a tire shown with damage occurring in the tread area of the tire, and a cavity formed in the tire after removal of damaged portion.

In one particular embodiment, enough material is excised from the tire 10 about the damaged portion 18 such that the remaining material on the tire 10 about the opening 20 is undamaged. In other words, the damaged portion is removed at least to a point where the reinforcements 22 are firmly encased in undamaged rubber. In another particular embodiment, at least two millimeters of cord or cable 22 is removed beyond the visibly damaged cord or cable. If, however, as illustrated in FIG. 4b, the damaged section is located on an inner portion 14 of the tire 10 such as, for example, under the tread 14, the method may comprise removing at least part of the damaged portion of the tire to form a cavity 21 in the tire rather than forming an aperture 20 through the tire 10.

The damaged section 18 may be cut, ground, burned, or otherwise removed from the outer surface of the tire 10, or if desired, may be removed from the inner surface of the tire 10. In one particular embodiment, removal of the damaged portion comprises not only removing the rubber portion of the tire, but also cutting and removing a portion of one or more damaged reinforcements 22 in the tire as well. In the removal process, standard tools and established techniques can be used, such as grinders, burnishers, or rasps.

In a particular embodiment, after removal of any damaged portion 18, the tire 10 comprises an aperture or opening 20 that extends through the tire 10. In the embodiment of FIG. 2a, the aperture 20 extends through the sidewall 12 of the tire. As mentioned previously, it is contemplated that during removal of the damaged portion 18, portions of damaged reinforcements 22 may be removed, and therefore the ends of the remaining reinforcements 22 may be visible about the perimeter of the opening 20. In one particular embodiment, the aperture 20 is not sized to accommodate a particular size of patch. Rather, the size of the aperture 20 is based mainly on the size of the damaged portion 18, in that the larger the size of the damaged portion 18, the larger the size of the aperture 20. Similarly, it is contemplated that any shape of opening 20 can be formed, as the shape of the opening 20 is also not necessarily based on accommodating a particular shape of patch.

In one embodiment, as illustrated in the FIGS. 2-4b, the opening 20 comprises a substantially consistent width from top to bottom, such that the same number of cords or cables 22 are exposed in the top portion of the aperture 20 as are exposed in the bottom portion of the aperture 20. If the tire 10 is a radial tire 10, and the damage is in the sidewall 12 or shoulder 16 of the tire, the opening 20 may be generally a trapezoidal shape, with the smaller end of the trapezoid closer to the bead of the tire, because the radially-extending reinforcements 22 are spaced farther apart as the reinforcements 22 extend radially outwardly.

Figure 3:
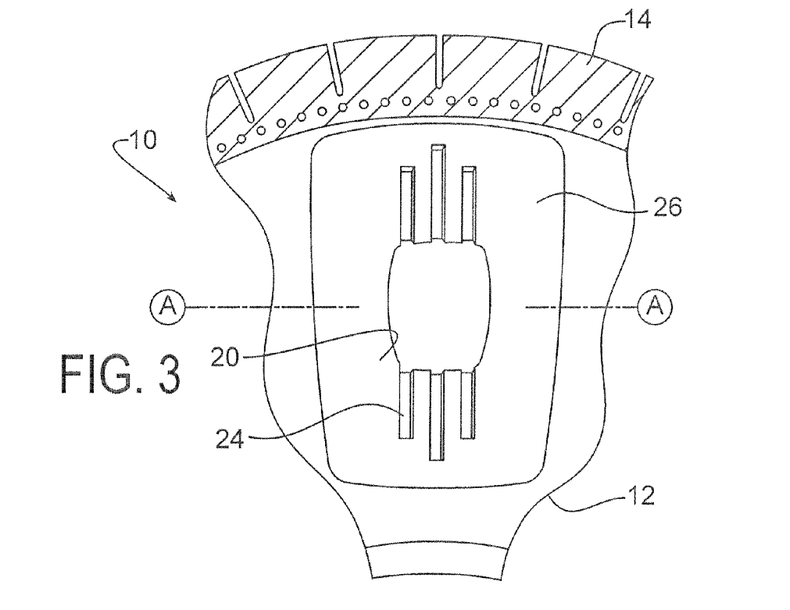
FIG. 3 is a side view of the inner portion of the tire shown in FIG. 2a, illustrated with grooves formed in the tire and a buffed or cleaned area surrounding the aperture.

The methods may further include the step of forming one or more grooves or skivings 24 in the tire 10 adjacent to and extending from the aperture 20 or cavity 21. In a particular embodiment, the grooves 24 are formed by removing material from the tire adjacent to the opening 20 or cavity 21. Typically, the grooves 24 are formed along the interior or inner surface of the tire 10, as illustrated in FIGS. 3 and 4. However, the grooves 24 can also be formed in the outer surface of the tire 10.

Figure 11:
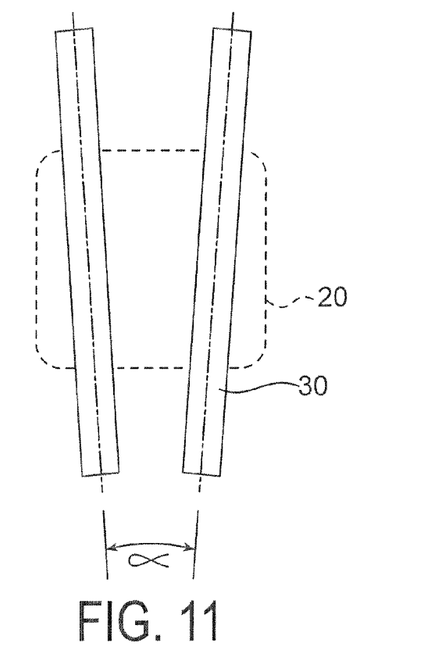
FIG. 11 is a schematic view illustrating an opening, with grooves extending in a radial direction.
Figure 12:
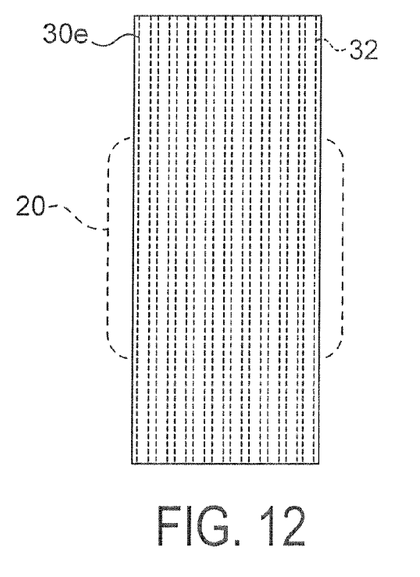
FIG. 12 is a schematic view illustrating an opening, with reinforcements contained in a repair ply having multiple reinforcements therein.
Figure 13:
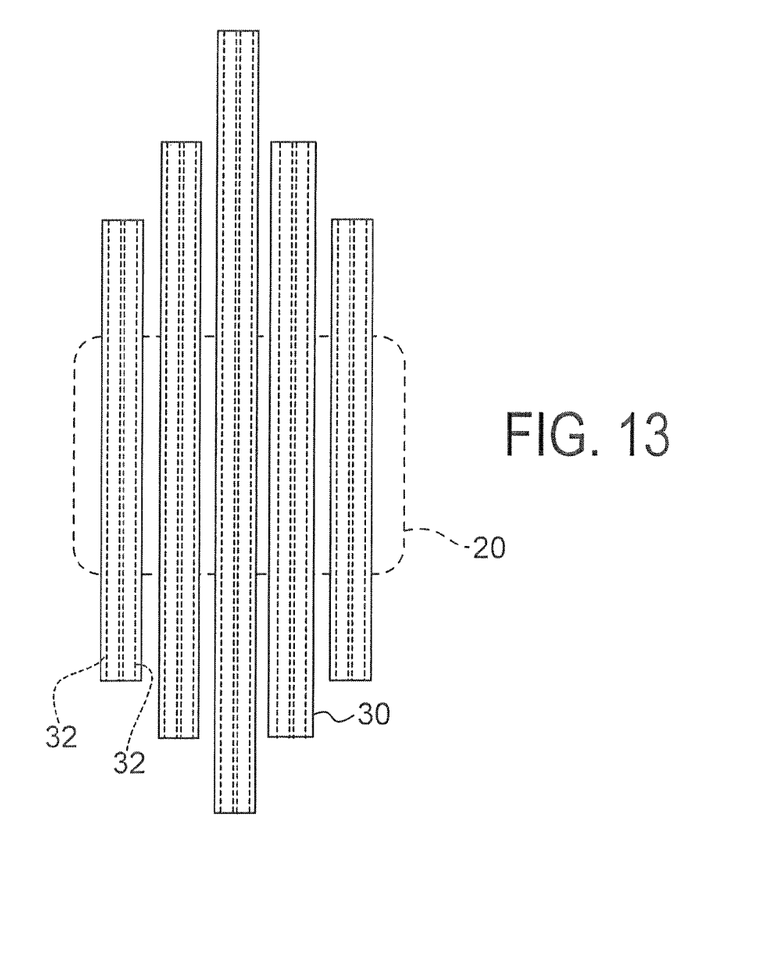
FIG. 13 is a schematic view illustrating an opening, with grooves extending parallel to each other.

The grooves 24 may extend in any direction relative to the tire 10 and opening 20. For example, in FIGS. 3 and 13, the grooves extend parallel to each other. FIG. 11 illustrates another embodiment wherein the grooves 24 extend in a radial direction relative to the tire 10 and therefore have an angle α formed between them. In one particular embodiment, at least some of the grooves 24 extend in a direction substantially parallel to the adjacent tire reinforcements 22. The grooves 24 also may be formed from any of a plurality of known techniques. In one particular embodiment, a hot regrooving tool is used to form the grooves 24, although use of other tools such as ultrasonic cutters and grinders is also contemplated.

The width of the grooves 24 can be adapted to the user's preferences and as necessary for the particular circumstances. For example, in one embodiment, the grooves 24 are sized to accommodate a single repair reinforcement 32 or repair ply 30a having a single reinforcement 32. In other embodiments, the grooves 24 are sized to accommodate multiple reinforcements 32 or one or more repair plies such as 30b and 30d having multiple reinforcements 32. Furthermore, rather than a plurality of grooves 24 and reinforcements 32 or repair plies 30, in one particular embodiment a single groove 24 is formed that accommodates a single repair ply 30e having multiple reinforcements 32 extending therethrough.

Figure 5A:
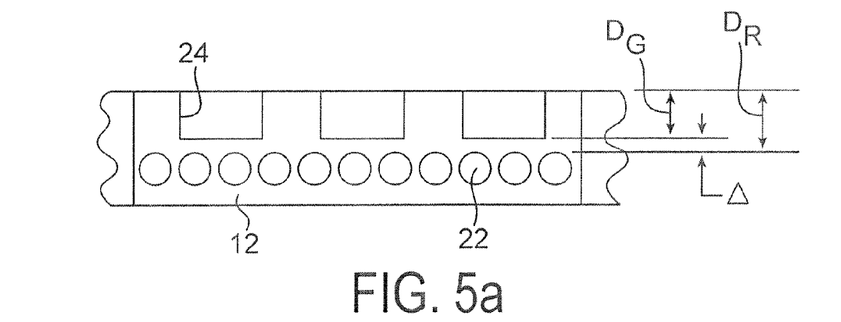
FIG. 5a is a section view through line A-A illustrated in FIGS. 3 and 4.

With regard to the depth of the grooves 24, no particular depth is required. However, in one embodiment, the depth of the groove is substantially equal to or slightly shallower than the thickness of the repair reinforcement 30 or 32, as described in more detail below. Generally, the bottom of the groove 24 is as close to the reinforcements 22 as is reasonably practicable under the circumstances. FIG. 5a illustrates a cross-sectional view of the aperture 20 along line A-A of FIG. 4a. The cross-section of the tire 10 portion has a thickness whereby the reinforcements 22 are located at a depth $D_R$ measured in this instance from the inside surface of the tire 10. The grooves 24 also have a depth, $D_G$, also measured from the inside surface of the tire 10 to the bottom of the groove 24. In one particular embodiment, the difference $\Delta$, measured as $D_R$ minus $D_G$, is less than five millimeters. In another embodiment, the difference $\Delta$, measured as $D_R$ minus $D_G$, is about one-half millimeter to two millimeters. In this manner, it can be appreciated that the plane of the repair reinforcements 32 and the plane of the tire's reinforcements 22 will be in close proximity, which minimizes the effects of shear amplitude, including the resultant sidewall bulging upon inflation of the tire 10.

It is contemplated that the grooves 24 may be of any length. In one particular embodiment, each groove 24 extends outward from the opening 20 by a length L of at least fifty millimeters. In another embodiment as illustrated in FIGS. 3-4, at least two of the grooves comprise different lengths. In yet another embodiment, the grooves 24 have the same length but at least two of the grooves 24 are offset or staggered from one another. Finally, it is contemplated that the grooves 24 may have the same length with ends that are not offset or staggered from each other.

The method may further include the step of placing at least one repair reinforcement within each of the one or more grooves 24. The repair reinforcements 32 may comprise any reinforcement discussed and contemplated above, with reference to the tire reinforcements 22. Alternatively, one or more repair reinforcements 32 can be coated with or embedded within a polymer 34 such as rubber to form a repair ply 30. In one particular embodiment, the repair ply comprises a sheet of rubber having a plurality of reinforcements embedded therein. FIGS. 10a-10d illustrate exemplary embodiments of repair plies 30a-30d. The term "repair reinforcement" is therefore meant to encompass both reinforcements 32 and repair plies 30.

Figure 5B:
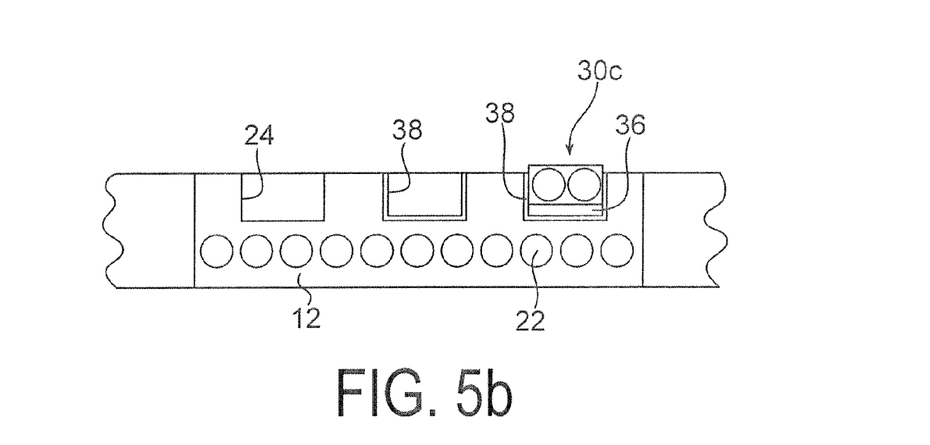
FIG. 5b is a section view similar to FIG. 5a, shown with an adhesive and repair ply placed in a groove.
Figure 6:
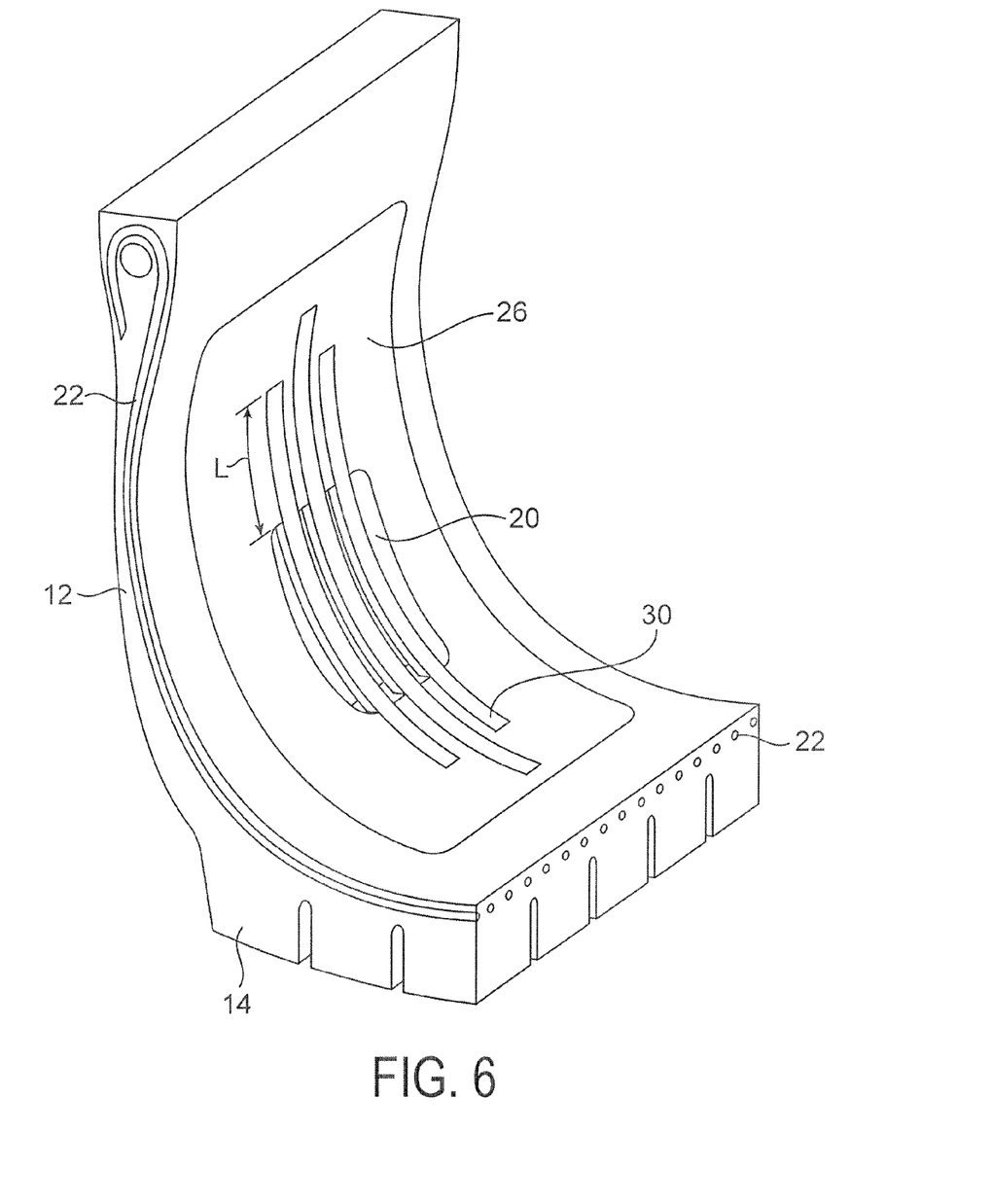
FIG. 6 is a perspective view of the portion of the tire shown in FIGS. 3 and 4, illustrated with reinforcements placed within the grooves.

The repair reinforcements 30 or 32 extend across or span the aperture 20 when placed in a groove 24. FIG. 6 illustrates such placement of repair plies 30 into the grooves 24. In one particular embodiment as illustrated in FIG. 5b, an adhesive 38 such as rubber cement is first placed in the groove 24 as needed to at least partially secure the repair reinforcement 30 or 32 relative to the groove 24.

As mentioned above, in one particular embodiment, the depth $D_G$ of the groove 24 is substantially equal to or slightly shallower than the thickness of the repair reinforcements 30, 32. For example, in FIG. 5b, repair ply 30c is shown in a groove 24. As illustrated, repair ply 30c extends slightly outward of the groove 24. However, it is also contemplated that the depth $D_G$ of the groove 24 is deeper than the thickness of the repair reinforcement. In such an embodiment, filler material such as rubber or rubber cement can be placed under or over the repair reinforcement 30 or 32 such that the thickness of the installed repair reinforcement 30 or 32 is substantially equal to or higher than the surrounding material.

Particular embodiments of the disclosed methods comprise any of a plurality of different types of repair reinforcements 30 or 32. In one particular embodiment, the repair reinforcement is a repair ply 30 such as repair plies 30a, 30b, 30c, and 30d having one or more reinforcements 32 contained therein. However, it is also contemplated that the repair reinforcement may be one or more reinforcements 32. Additionally, the repair reinforcements 30, 32 are not required to be the same as the reinforcements 22 in the tire, either in number or composition. For example, if portions of five damaged metallic cables are removed to from aperture 20, any number of repair reinforcements 30 or 32 can be used in the repair, and the repair reinforcements 30 or 32 may comprise either cables or cords. Furthermore, the size, such as the circumference, of the repair reinforcements 30 or 32 may be different from tire reinforcements 22.

Figure 10A:
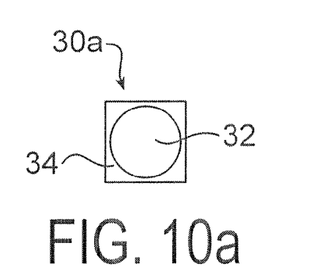
FIG. 10a illustrates a cross section of a repair ply having a single reinforcement therethrough.
Figure 10B:
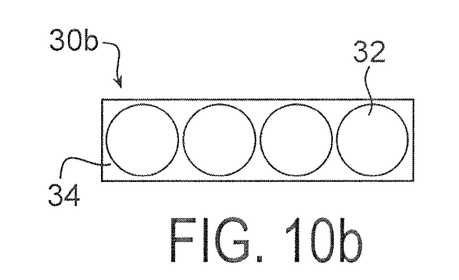
FIG. 10b illustrates a cross section of a repair ply having a multiple reinforcements therethrough.
Figure 10C:
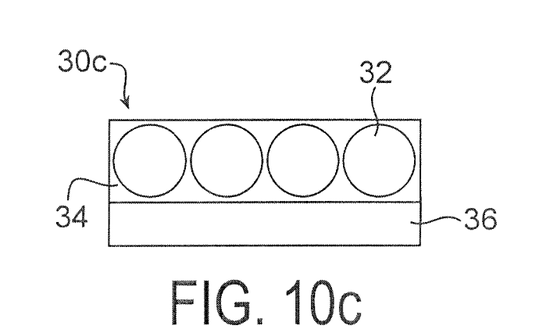
FIG. 10c illustrates a cross section of a repair ply having multiple reinforcements therethrough that are offset from the center of the reinforcement.
Figure 10D:
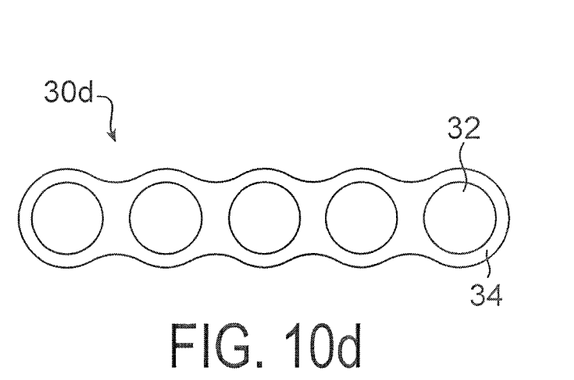
FIG. 10d illustrates a cross section of a repair ply having five reinforcements coated with a thin layer of rubber.

Repair ply 30a comprises a single reinforcement 32 contained within a polymer such as skim rubber 34. Repair plies 30b, 30c, and 30d comprise a plurality of reinforcements 32 contained within rubber 34, the reinforcements 32 generally being spaced equally across the width of the respective reinforcement 30b, 30c, or 30d. Additionally, the reinforcements 32 can be spaced substantially equidistant between the top and bottom of the reinforcement, as in reinforcements 30 and 30b. However, as illustrated in FIG. 10c, the reinforcements 32 may be located nearer the top or bottom of the reinforcement 30c. In one particular embodiment as illustrated in FIG. 10c, the repair ply 30c comprises two layers 34, 36 of rubber that are joined together with, for example, uncured rubber or rubber cement. Alternatively, the repair ply may comprise a single piece of rubber 34 with cables or cords 32 embedded therein nearer the top or bottom of the rubber 34.

The method may further include the step of placing a patch 28 on the tire to cover each repair reinforcement 30 or 32. Typically, if an aperture 20 is formed during the repair process, the patch 28 is applied to cover the aperture 20 as well each repair reinforcement 30 or 32. Adhesives can be applied to the patch and/or the tire as needed to form a secure attachment.

Figure 7A:
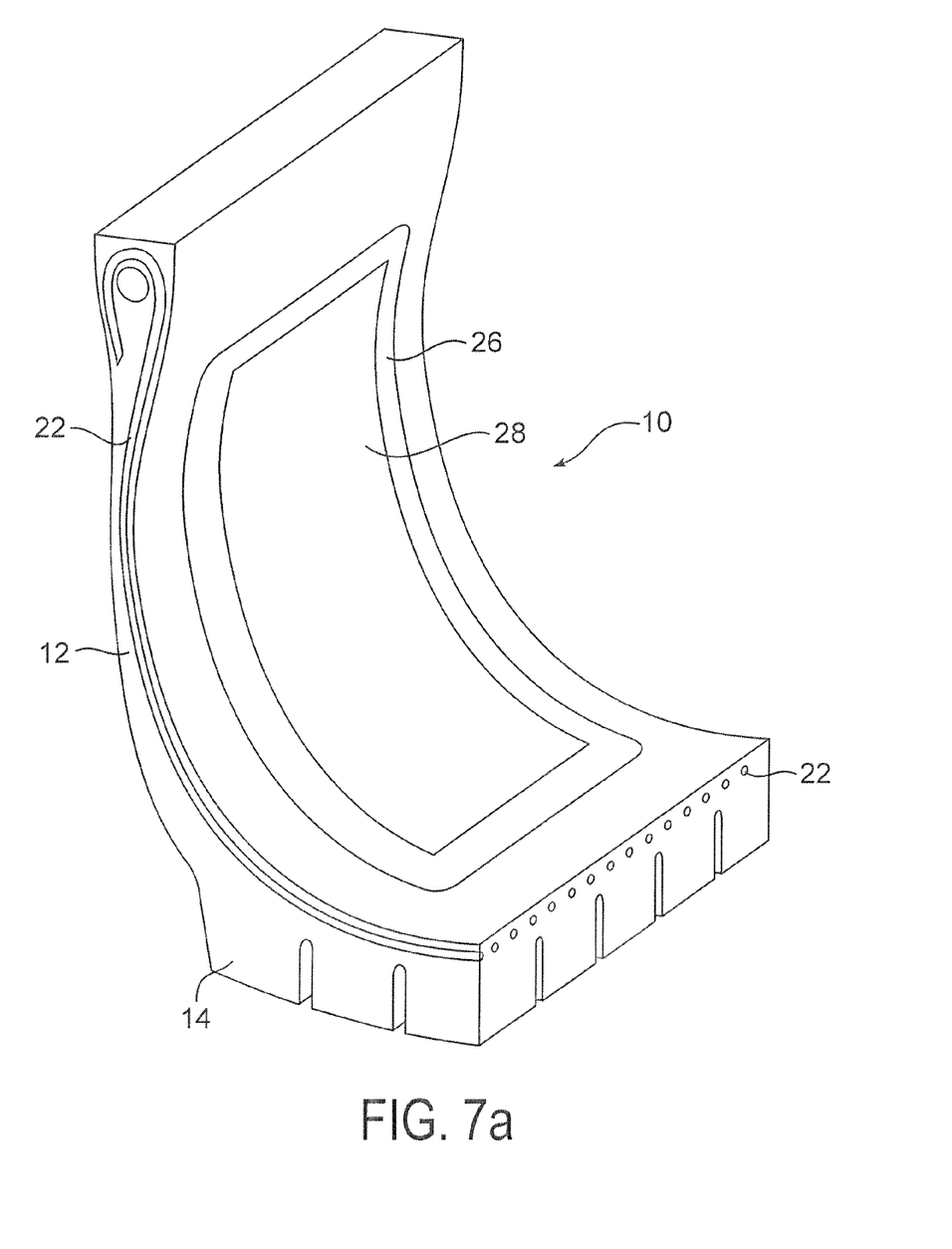
FIG. 7a is a perspective view of the portion of the tire shown in FIG. 6, illustrated with a patch applied to cover the aperture.

In one particular embodiment, as illustrated in FIG. 7a, the patch 28 is a non-reinforced patch that comprises a first layer of rubber that is compatible with the repair reinforcements 30 or 32 and the surface 26 of the tire 10 to which it contacts, along with a second layer of rubber that has low air permeability. Such a patch 28 is designed purely for adhesion and air retention, and is not compromised by an additional requirement of providing structural support. In another embodiment, the patch 128 comprises a plurality of reinforcements 29 embedded within the patch 128.

Figure 7B:
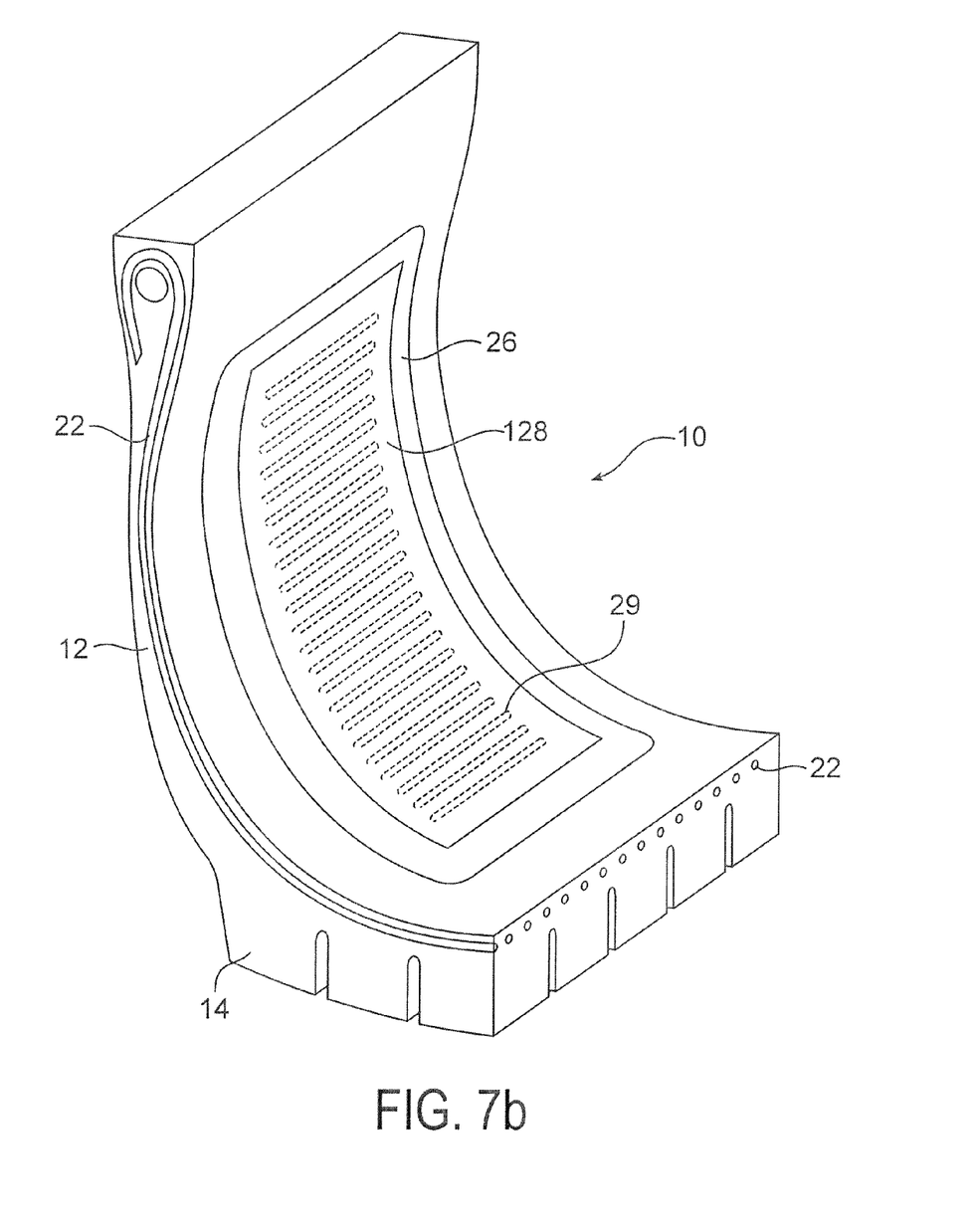
FIG. 7b is a perspective view of the portion of the tire shown in FIG. 6, illustrated with a reinforced patch applied to cover the aperture.
Figure 8:
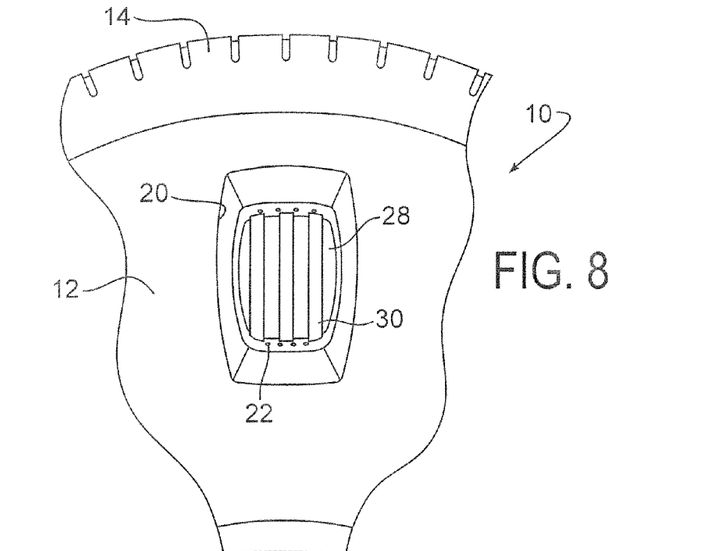
FIG. 8 is a side view of the outer portion of the tire illustrated in FIG. 7.

Prior to application of the patch 28, an area 26 about the opening 20 may be buffed and/or cleaned with solvent and vacuumed to remove any debris or demolding lubricant on the surface to which the patch 28 adheres. FIGS. 6-8 illustrate an embodiment wherein the grooves 24 are formed on the inner surface of tire 10. Specifically, FIG. 6 illustrates the inner surface of tire 10 with area 26 buffed and/or cleaned, and FIGS. 7a-7b illustrate perspective views of the inner surface of the tire 10 after application of the patch 28 or 128. Finally, FIG. 8 illustrates an outer view of the tire 10 after the patch 28 is applied.

Figure 9:
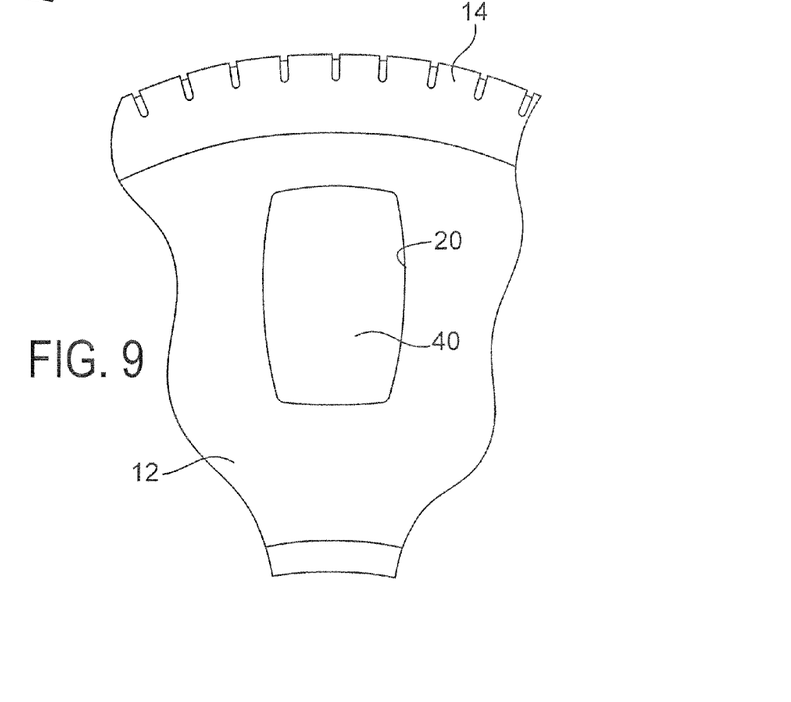
FIG. 9 is a side view of the portion of the tire illustrated in FIG. 8, shown with filler material placed within the aperture.

The method may further include the step of applying material 40 to fill the remainder of the opening 20 or cavity 21. Generally, the material is applied to fill the remainder of the opening 20 on a side of the tire opposite the repair reinforcements 30 or 32 and patch 28. As mentioned previously, the grooves 24, repair reinforcements 30 or 32, and patch 28 are typically located on an inner surface of the tire 10, and therefore the step of applying material 40 will typically be performed from the outer surface of the tire 10. FIG. 9 illustrates a side view of an outer portion of tire 10 after application of the filler material 40. The filler material may comprise uncured rubber or any other suitable rubber.

If a cavity 21 is formed by the removal of the damaged portion rather than the formation of an aperture 20, as mentioned previously, the method may comprise applying material 40 to fill the remainder of the cavity 21. It is contemplated that this step could be performed before placing the patch 28 or 128 over the repair reinforcements 30 or 32 and the remainder of the cavity 21, so that air is not trapped under the patch 28.

In one particular embodiment, the filler material 40 is a rubber material 40, and the rubber material 40 is applied to the level of the surrounding tire area. After the filler material is applied, it is shaped to blend with the exterior features of the tire. In yet another particular embodiment, one or more of the materials used in the disclosed section repair is uncured rubber. In such an embodiment, at least the portion of the tire that comprises uncured rubber is then cured in the standard manner in an envelope in an autoclave, or with a spotter.

Figure 14:
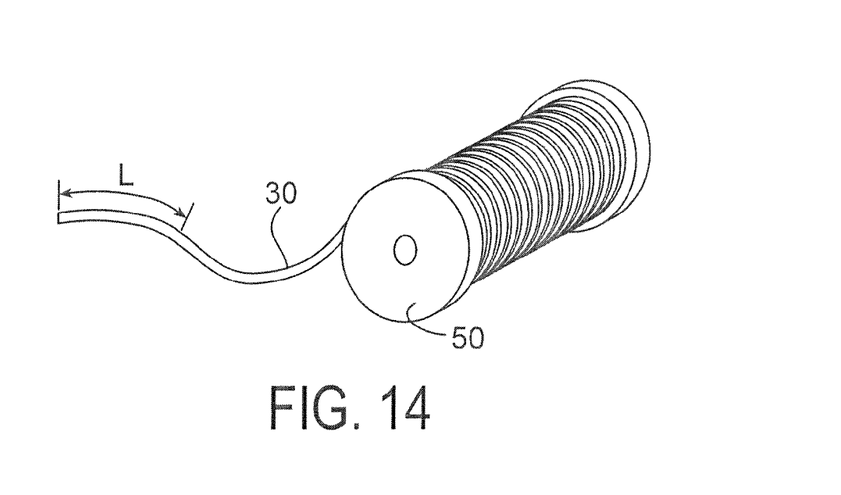
FIG. 14 illustrates a spool with repair reinforcement wound about the spool.

The method may further include the step cutting a repair reinforcement from a spool to a length (L) to fit within a groove, prior to positioning the repair reinforcement into the groove. By cutting one or more of the repair reinforcements from a spool, there is no requirement to form the grooves to a particular length. Furthermore, the ability to cut the repair reinforcements 30 to a given length enables the user the ability to repair damaged areas of different sizes without an increased cost or a requirement to stock multiple lengths of repair reinforcements 30.

While this invention has been described with reference to particular embodiments thereof, it shall be understood that such description is by way of illustration and not be way of limitation. Accordingly, the scope and content of the invention are to be defined only by the terms of the appended claims.

What is claimed is:

1. A method of repairing a damaged portion of a tire, the method comprising the steps of:
    removing at least part of the damaged portion of the tire to form an opening through the tire;
    forming a plurality of grooves along an exposed surface of the tire adjacent to and extending from each of a pair of opposing radial ends of the opening, each of the plurality of grooves having a length extending away from the opening and the plurality of grooves being spaced apart in a side-by-side arrangement along a perimeter of the opening at each of the pair of opposing radial ends of the opening;
    placing at least one repair reinforcement within each of the plurality of grooves, each of the repair reinforcements extending across the opening where opposing ends of each reinforcement are arranged in one of the plurality of grooves on each of the pair of opposing radial ends of the opening;
    placing a patch on the tire to cover a first side of the opening and each at least one repair reinforcement, the patch being separate from each at least one repair reinforcement and the step of placing at least one repair reinforcement occurring before the step of placing a patch on the tire; and,
    applying material to fill the remainder of the opening.

2. The method of claim 1, wherein the exposed surface in which the plurality of grooves are formed is an inner surface of the tire, and the patch is placed on the inner surface of the tire.

3. The method of claim 1, wherein the material is applied to fill the remainder of the opening on a side of the tire opposite the repair reinforcements and the patch.

4. The method of claim 1, wherein the length of each of the plurality of grooves extends substantially parallel to at least one adjacent tire reinforcement.

5. The method of claim 1, wherein the length of each of the plurality of grooves extends in a radial direction relative to the tire.

6. The method of claim 1, wherein the length of each of the plurality of grooves extend substantially parallel to one another.

7. The method of claim 1, further comprising the step of curing at least the repaired portion of the tire.

8. The method of claim 1, wherein the at least one repair reinforcement is contained within a repair ply, the repair ply comprising a sheet of rubber, containing the at least one reinforcement.

9. The method of claim 1, wherein prior to positioning the at least one repair reinforcement into the plurality of grooves, the method further includes a step of cutting each of the one or more repair reinforcements to a length to fit within each of the plurality of grooves.

10. The method of claim 1, wherein before the step of placing the at least one repair reinforcement within each of the plurality of grooves, rubber cement is first placed into each of the plurality of grooves.

11. The method of claim 1, wherein the patch comprises a plurality of reinforcements embedded therein.

12. The method of claim 1, wherein an end of the length of at least two of the plurality of grooves arranged away from the opening are offset relative to each other in a longitudinal direction of the at least two grooves.

13. A repaired tire having:
    a repaired damaged portion having a filled opening extending between an outer and inner surface of the tire, the filled opening including cured material extending between the outer surface of the tire and one or more repair reinforcements extending across the filled opening where opposing ends of each reinforcement are arranged in one of a plurality of filled grooves arranged adjacent to and extending from each of a pair of opposing radial ends of the filled opening, each of the plurality of filled grooves having a length extending away from the filled opening, the plurality of filled grooves being spaced apart in a side-by-side arrangement along a portion of a perimeter of the opening at each of the opposing radial ends of the opening;
    a patch arranged along a surface of the tire to cover the filled opening and the one or more repair reinforcements.

14. The repaired tire of claim 13, wherein each of the one or more grooves has a length extending substantially parallel to at least one adjacent tire reinforcement extending within the tire.

15. The repaired tire of claim 13, wherein the patch comprises a plurality of reinforcements embedded therein.

16. The repaired tire of claim 13, wherein an end of the length of at least two of the plurality of filled grooves arranged away from the opening are offset relative to each other in a longitudinal direction of the at least two grooves.

* * * * *